United States Patent
He

(10) Patent No.: US 10,387,800 B2
(45) Date of Patent: Aug. 20, 2019

(54) SYSTEM AND METHODS FOR GENERATING REASON CODES FOR ENSEMBLE COMPUTER MODELS

(71) Applicant: WePay, Inc., Palo Alto, CA (US)

(72) Inventor: Jun He, Fremont, CA (US)

(73) Assignee: WePay, Inc., Redwood City, CA (US)

( * ) Notice: Subject to any disclaimer, the term of this patent is extended or adjusted under 35 U.S.C. 154(b) by 0 days.

(21) Appl. No.: 15/030,854

(22) PCT Filed: Oct. 30, 2015

(86) PCT No.: PCT/US2015/058502
§ 371 (c)(1),
(2) Date: Apr. 20, 2016

(87) PCT Pub. No.: WO2017/003499
PCT Pub. Date: Jan. 5, 2017

(65) Prior Publication Data
US 2018/0101788 A1    Apr. 12, 2018

Related U.S. Application Data

(60) Provisional application No. 62/186,208, filed on Jun. 29, 2015.

(51) Int. Cl.
| | |
|---|---|
| G06N 99/00 | (2019.01) |
| G06F 17/18 | (2006.01) |
| G06N 7/00 | (2006.01) |
| G06N 5/04 | (2006.01) |
| G06N 20/00 | (2019.01) |

(52) U.S. Cl.
CPC ............. *G06N 20/00* (2019.01); *G06F 17/18* (2013.01); *G06N 5/04* (2013.01); *G06N 7/005* (2013.01)

(58) Field of Classification Search
CPC ........ G06N 99/005; G06N 7/005; G06N 5/04; G06F 17/18
USPC .......................................................... 706/12
See application file for complete search history.

(56) References Cited

U.S. PATENT DOCUMENTS

| | | | | |
|---|---|---|---|---|
| 2010/0191722 A1* | 7/2010 | Boiman | ............ | G06F 17/30787 707/723 |
| 2013/0138577 A1* | 5/2013 | Sisk | ....................... | G06Q 30/02 705/36 R |
| 2013/0339218 A1 | 12/2013 | Subramanian et al. | | |

(Continued)

Primary Examiner — Kuen S Lu
(74) Attorney, Agent, or Firm — Duane Morris LLP

(57) ABSTRACT

A new approach is proposed to support two variants of the approach to effectively generate reason codes for an ensemble model. Both variants involve treating the ensemble model as a black box, identifying trivial values for input variables to the ensemble model, replacing each of the input variables to the ensemble model with its corresponding trivial values and then evaluating the impact on a score of the model after the trivial value replacement. The evaluation result of the impact is then used to generate the reason codes for the ensemble model. Specifically, the first variant is configured to perform one round of replacement, wherein variables with top drops in the score will be the reason codes. The second variant is configured to perform multiple rounds of replacement, which in each round, keeps the identified reason codes variables replaced with trivial values and analyzes incremental drops of replacing remaining variables.

24 Claims, 3 Drawing Sheets

(56) References Cited

U.S. PATENT DOCUMENTS

| | | |
|---|---|---|
| 2014/0058763 A1 | 2/2014 | Zizzamia et al. |
| 2014/0067461 A1 | 3/2014 | Zhang et al. |
| 2014/0200930 A1* | 7/2014 | Zizzamia ................ G06F 17/18 705/4 |
| 2014/0279752 A1* | 9/2014 | Milana .................... G06N 5/00 706/12 |
| 2014/0297268 A1* | 10/2014 | Govrin ................... G06Q 40/02 704/9 |
| 2015/0073759 A1* | 3/2015 | Vepakomma ........ G06Q 50/265 703/6 |
| 2015/0112883 A1* | 4/2015 | Orduna ................ G06Q 50/265 705/325 |
| 2015/0379430 A1* | 12/2015 | Dirac ................... G06N 99/005 706/12 |

* cited by examiner

SYSTEM AND METHODS FOR GENERATING REASON CODES FOR ENSEMBLE COMPUTER MODELS

CROSS-REFERENCE TO RELATED AND CO-PENDING APPLICATIONS

The present application is a U.S. national stage application under U.S.C. § 371 of International Patent Application No. PCT/US2015/058502, filed Oct. 30, 2015. which claims the benefit of U.S. Provisional Patent Application No. 62/186,208 filed on Jun. 29, 2015, and entitled "System and Methods for Generating Reason Code of Ensemble Computer Models," the entireties of each are expressly incorporated herein in its entirety by reference.

BACKGROUND

Computer models have been widely applied in various industries to make predictions to improve business performance or mitigate risk. Such computer models usually produce a score (a numeric value) to predict the probability that certain event will happen. Even though sometimes a model score solely by itself is enough for decision making, reason codes to explain why certain case is assigned with a high score by the model are desirable in certain business practices, including but not limited to credit risk scoring, credit card fraud detection. In the non-limiting example of credit risk scoring, the agency that provides such score to customers is also required to provide the reasons why the score is not higher. In the non-limiting example of fraud detection, when reviewing the cases referred by the model as high risk, analysts need to understand why one transaction gets referred for more targeted and efficient reviews.

Reason codes can be considered as input variables to a model that contribute the highest fraction to the model score being high, or a more descriptive format of the model related to such input variables. Methods to generate reason codes have been put forward previously for logistic regression and neural networks. For logistic regression, reason codes are typically generated by ranking the products of input variables multiplied by their own weights. A model score is produced by summation of such products and then fed into a sigmoid function. Top ranking input variables make bigger contributions to the model score, hence will be the reason codes. Another method was proposed to generate reason codes for credit risk scores, which calculates maximum improvement of the score by changing the value for one variable, which was called "area of improvement." The variables were then ranked by the "area of improvement", and the top ranked input variables were the reason codes. Although such method may be applied to logistic regression and neural networks methods. It did not, however, propose clearly how to find the change of input variables to obtain the maximum improvement.

Many industrial applications of computer models require the model to generate reason codes, which are input variables that produce the biggest impact on the score of a model. In recent years, ensemble methods, such as bagging, boosting, random forest, or other methods that combine (for example, by averaging or some sort of weighted summation of) the outputs from multiple models into an ensemble model have gained popularity in industrial applications due to their higher performance in prediction and classification compared with conventional single model application. As models become more complex, examining the structures of ensemble models to generate its reason codes becomes impractical (even when each individual model is simple and easy to obtain reason codes) because such models are usually treated as black box due to their complex nature. Even for like logistic regression or decision trees, combining the reason codes from the individual models inside the ensemble model becomes a challenge. Many organizations opt for simpler models with lower performance just because it is difficult to generate reason codes for ensemble models. It is thus desirable to be able to treat the ensemble model as a black box and effectively apply the ensemble model to generate reason codes under industrial settings.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
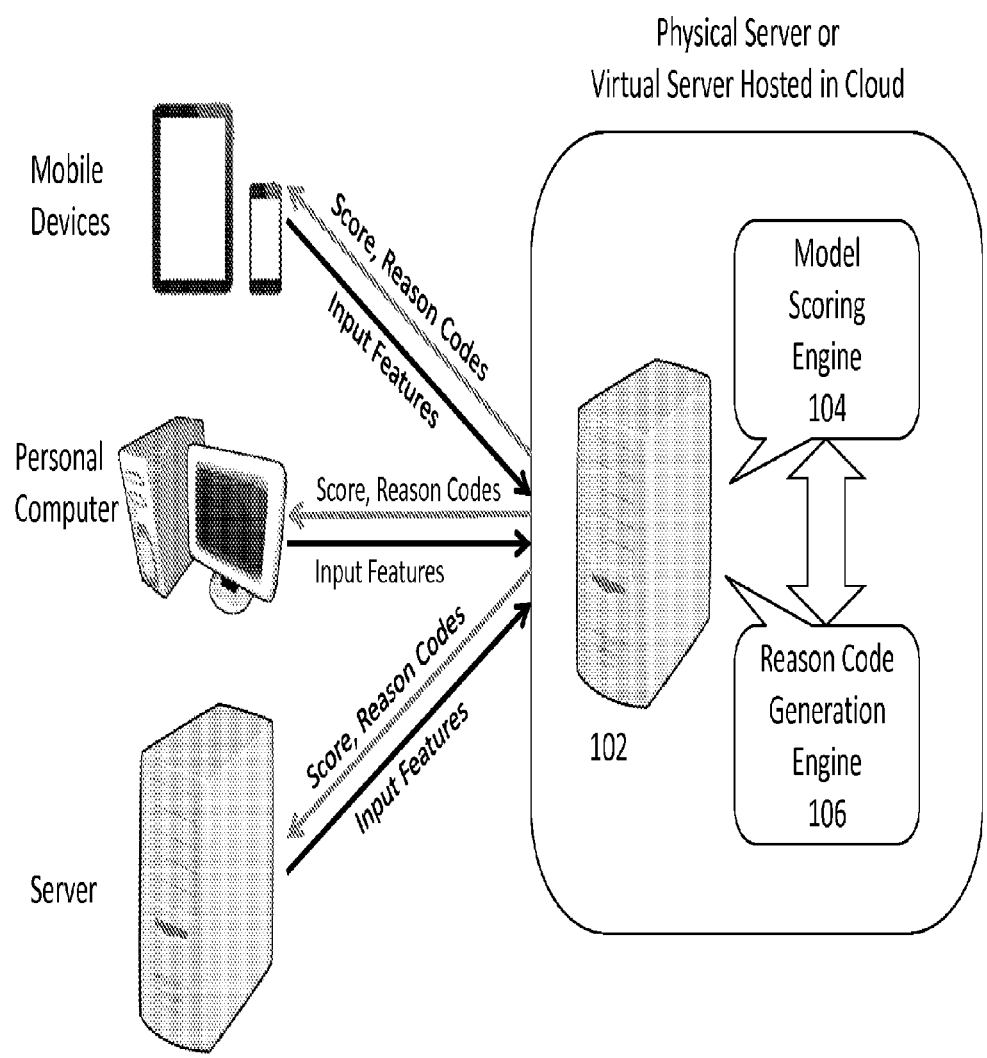
FIG. 1 depicts an example of a system diagram to support reason codes generation in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support two variants of the approach to effectively generate reason codes for an ensemble model. Both variants involve treating the ensemble model as a black box, identifying trivial values for input variables to the ensemble model, replacing each of the input variables to the ensemble model with their corresponding trivial values and then evaluating the impact on (e.g., drop of) a score of the model after the trivial value replacement. The evaluation result of the impact is then used to generate the reason codes for the ensemble model. Specifically, the first variant is configured to perform one round of replacement, wherein variables with top drops in the score will be the reason codes. The second variant is configured to perform multiple rounds of replacement, which in each round, keeps the identified reason codes variables replaced with their trivial values and analyzes incremental drops of replacing additional remaining variables.

As referred to hereinafter, an ensemble (computer) model is a collection of single models trained on the historical/training data, which is collection of input records/cases or data set with many rows of input variables and corresponding label, e.g. good vs bad, fraud vs non-fraud etc., to learn patterns in the history. The ensemble model can be used to calculate or infer the probabilities of certain input features to be bad or fraud in the future. A trivial value is defined as a value of the variable that predicts low score for an outcome/prediction of the ensemble model to be classified as an interesting class, given that the values of other variables remain unchanged. For a non-limiting example, under the fraud detection scenario with two-class labels of "fraud" and "non-fraud", where the ensemble model tries to predict "fraud", the interesting class, and associate high scores with fraud, a trivial value of a variable would give low score for the scored case to be "fraud." When the model score predicting the interesting class is high, the proposed approach evaluates the drops in the model score after replacing each variable with its trivial value to quantify the impact of each variable to the high model score.

FIG. 1 depicts an example of a system diagram to support reason codes generation for an ensemble model. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system includes at least module scoring engine 104 and reason codes generation engine 106. As used herein, The engine will typically include a computing unit/appliance/host and software instructions that are stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units of the computing unit, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits. The processes may alternatively be at least partially embodied in a digital signal processor formed of application specific integrated circuits for performing the processes.

In the example of FIG. 1, the module scoring engine 104 and the reason codes generation engine 106 run on a host 102, which can be either a physical server residing locally or a virtual server hosted by remote servers in a cloud. Here, the host 102 can be a computing device, a communication device, a storage device, or any microprocessor system, microprocessor-based or programmable consumer electronics, minicomputer, mainframe computer capable of running a software component. For non-limiting examples, a computing device can be but is not limited to a laptop PC, a desktop PC, a tablet PC, or a server running Linux or other operating systems.

In the example of FIG. 1, the host 102 has a communication interface (not shown), which enables the engines running on the host 102 to communicate with other computing devices following certain communication protocols, such as TCP/IP, http, https, ftp, and sftp protocols, over one or more communication networks (not shown). Here, the computing devices include but are not limited to, mobile/hand-held devices such as tablets, iPhones, iPads, Google's Android devices, and/or other types of mobile communication devices, PCs, such as laptop PCs and desktop PCs, and server machines. The communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

In the example of FIG. 1, the module scoring engine 104 is configured to accept input variables to an ensemble model from a user/computing device that make requests for evaluation. The module scoring engine 104 is then configured to calculate one or more scores for the ensemble model by identifying trivial values for input variables to the ensemble model, replacing one or more of the input variables to the ensemble model with one of the trivial values, and then evaluating the impact on (e.g., drop of) a score of the ensemble model after the trivial value replacement. The reason codes generation engine 106 is configured to generate reason codes for the ensemble model based on the evaluation of the impact on the score of the ensemble model after the trivial value replacement. The reason codes generation engine 106 is then configured to provide generated scores and reason codes back to the computing devices making the requests.

In some embodiments, the module scoring engine 104 is configured to identify trivial values for the input variables to the ensemble model under two requirements. The first is that the prediction or classification of the outcome of the ensemble model can be labeled into two classes, e.g., "0" vs. "1", "positive" vs. "negative", "fraud" vs "non-fraud", "default" vs. "not default", etc. The second is that the two classes of outcomes of the ensemble model need to be unbalanced with one class takes minority of the training data and the other class takes majority of the training data. The minority class is typically considered as the "interesting" class, which for non-limiting examples, can be but is not limited to transaction being fraudulent, loan default, product getting recommended, while the majority class is the "uninteresting" or "trivial" class.

Note that the two requirements described above are typically met by most real world applications of ensemble models. For non-limiting examples, default rate is typically a few percent for credit risk default prediction, fraud rate is from under one percent to a few percent for some extreme case for fraud detection, and customer to buy certain products or response to certain campaign are also rare events. Even though the approach described herein is most conveniently used for two-class problem, it can also be extended to multi-class problems, since one multi-class problem can be converted to multiple two-class problems.

Under these requirements, trivial values are easy to determine for unbalanced two-class problems. The value that majority of the training data take are good candidates for trivial values, since they predict high probability for the majority class (trivial class), or low probability for minority class (interesting class). For the value of an input variable to be trivial, it just needs to take the value of majority of training data. Here, candidates for trivial values include median, mean, mode (most frequent value), or other values and statistics deduced from training data that predict low probability for interesting class. In some embodiments, the median and mean work well for continuous numeric variables. In some embodiments, the most frequent value works well for categorical variables. In some embodiments, the module scoring engine 104 is configured to pre-calculate the trivial value of each input variable to the ensemble model based on the training data generated during previous evaluation and maintained by the module scoring engine 104 for future evaluation. Note that when all of the input variables take their trivial values at the same time, the model should return very low probability (close to 0) of an interesting class.

Figure 2:
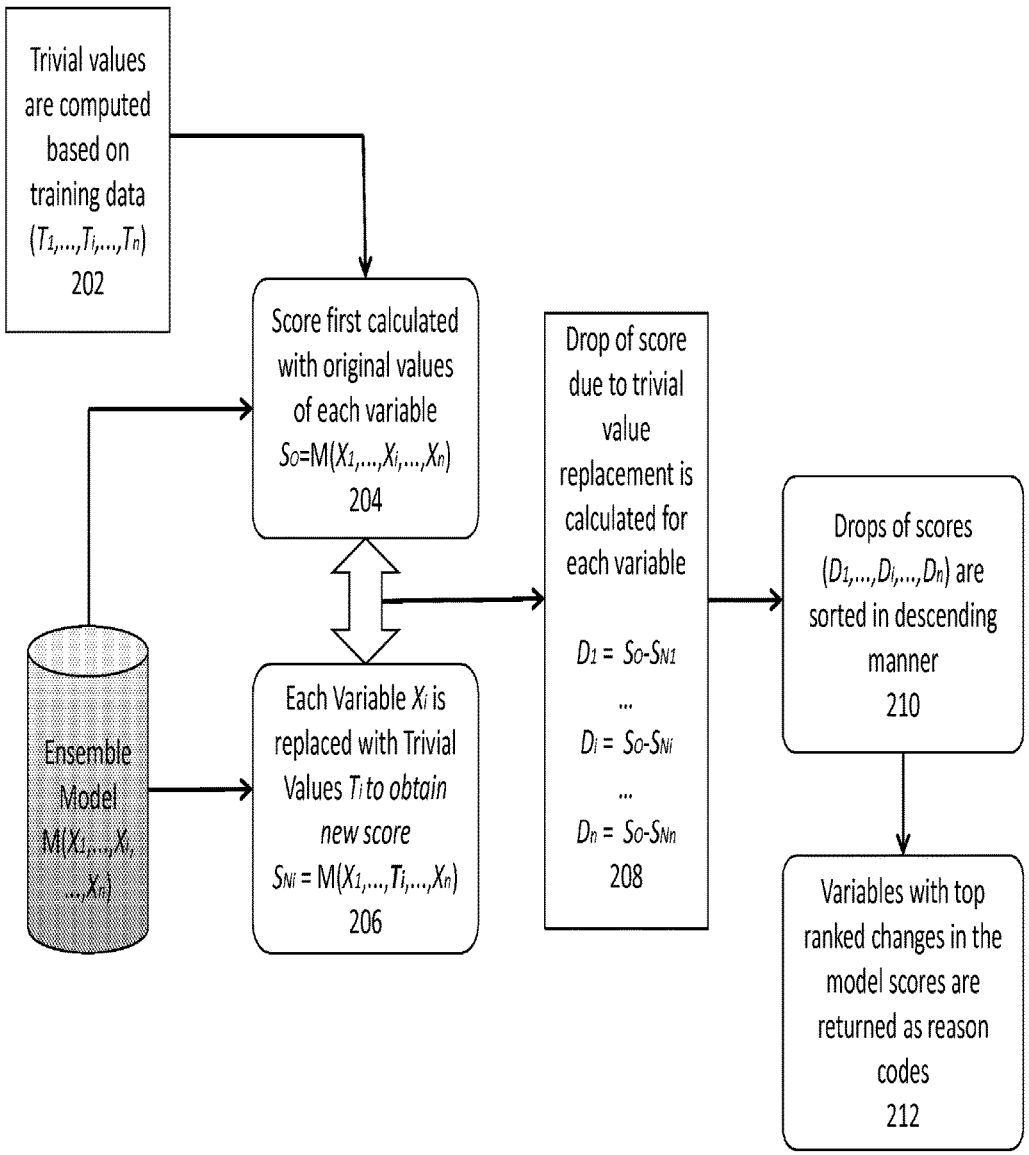
FIG. 2 depicts an example of a flowchart of a process to support a first variant of the approach to reason codes generation in accordance with some embodiments.

FIG. 2 depicts an example of a flowchart of a process to support a first variant of the approach to reason codes generation. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

Under the first variant of the trivial value replacement approach for reason codes generation disclosed in FIG. 2, the module scoring engine 104 is configured to directly replace the current value of only one of the input variables of the ensemble model at a time with its pre-calculated trivial value, and evaluate the drop of score produced by such trivial value replacement. The reason codes generation engine 106 is then configured to rank the drops of the scores produced by the variables, and choose the top ranked variables as the reason codes. Note that trivial value replacement of each variable may not always produce the maximum drop of model score possibly produced by this variable, but evaluating the drop across all variable is reliable enough to assess the impact of each variable on model score and generate the reason codes. Specifically, the first variant of the trivial value replacement approach includes the following steps:

1) Assuming that the ensemble model has n input variables $(X1, \ldots, Xi, \ldots, Xn)$, the module scoring engine 104 is configured to compute the trivial value $(T1, \ldots, Ti, \ldots, Tn)$ of the variables in advance based on training data at step 202. Here, the trivial values are variable values that predict low probability for the interesting class of the ensemble model, or predict high probability for the trivial class. For unbalanced two-class problem with minority class being interesting class, trivial value of a variable typically takes the value that majority of the population take or are close to, including median, mean, mode (most frequent value), or other values and statistics deduced from training data as discussed above.

2) At step 204, the module scoring engine 104 is configured to calculate an original model score SO for the input variables $(X1, \ldots, Xi, \ldots, Xn)$ to the ensemble model, M, based on original values of Xis, wherein M is a function of $(X1, \ldots, Xi, \ldots, Xn)$. Here, the function M can of any forms that user choose to train to the ensemble model, e.g., logistic function, or other generalized-functions for different modeling methods. The original model score SO calculated with original input values can be expressed as:

$SO=M(X1, \ldots, Xi, \ldots, Xn)$

3) At step 206, the module scoring engine 104 is configured to replace the original value of one of the input variable, Xi, with its pre-calculated trivial value, Ti, while keeping the values of other input variables the same. A new model score SNi is then calculated as:

$SNi=M(X1, \ldots, Ti, \ldots, Xn)$

Step 206 can be performed iteratively for every input variable Xi, i=1~n, until all of the Dis have been calculated.

4) At step 208, the module scoring engine 104 is then configured to calculate change/drop in the score Di due to trivial value replacement for each of the input variables as:

$Di=SO-SNi$

5) Once the drops of model scores $(D1, \ldots, Di, \ldots, Dn)$ due to replacement of original variable values with trivial values have been calculated, the reason codes generation engine 106 is configured to rank these drops of model scores $(D1, \ldots, Di, \ldots, Dn)$, e.g., in descending order from high to low at step 210.

6) At step 212, the reason codes generation engine 106 is configured to return the variables that produce the top ranked changes in the model scores as reason codes back to a computing device making the request.

Figure 3:
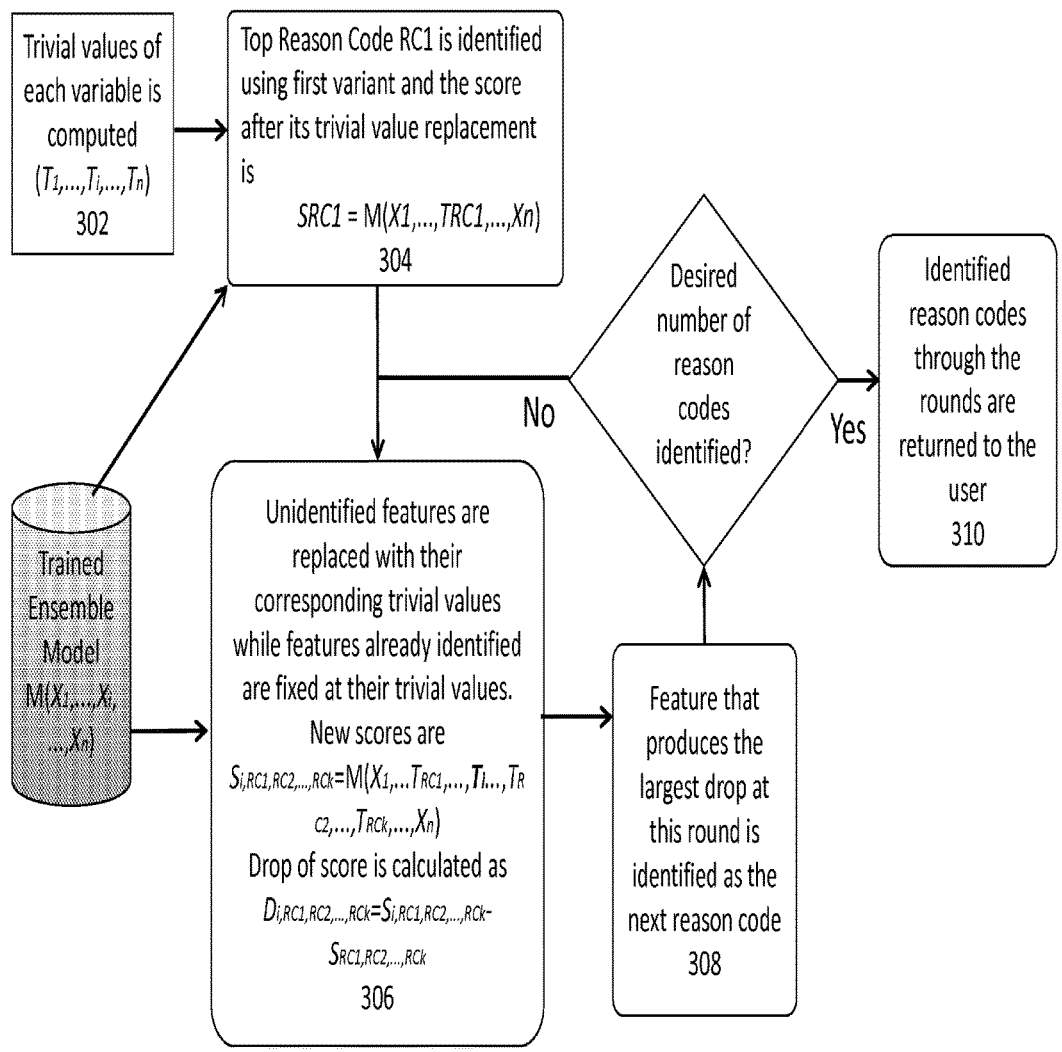
FIG. 3 depicts an example of a flowchart of a process to support a second variant of the approach to reason codes generation in accordance with some embodiments.

FIG. 3 depicts an example of a flowchart of a process to support a second variant of the approach to reason codes generation, which is a stepwise version of the first variant discussed above. Unlike the first variant which only replaces one input variable with trivial values at a time, the second variant performs multiple rounds of the first variant, and find the variables that make the biggest incremental impact on the scores in a stepwise fashion in order to evaluate impact of interactions between two or more variables at the same time. Specifically, the second variant of the trivial value replacement approach includes the following steps:

1) At step 302, the module scoring engine 104 is configured to compute the trivial value $(T1, \ldots, Ti, \ldots, Tn)$ of the variables in advance based on training data in the same way as the first variant.

2) At step 304, the module scoring engine 104 is configured to identify the top reason codes using steps 2-5 of the first variant described above, wherein the variable that produces the largest drop of score is identified as the first reason code, e.g., RC1, and the score after its trivial value replacement is $SRC1=M(X1, \ldots, TRC1, \ldots, Xn)$ 3) At step 306, the module scoring engine 104 is configured to replace unidentified variables with their corresponding trivial values while variables already identified as reason codes are fixed at their trivial values. As such, the next round of reason codes identification starts with input variables $(X1, \ldots, TRC1, \ldots, Xn)$, wherein one more variable Xi except RC1 is replaced with its trivial value Ti and a new score is calculated, $Si,RC1=M(X1, \ldots, Ti, \ldots TRC1, \ldots, Xn), i=1$~$n$ except $RC1$ and the corresponding drop of score is calculated, $Di,RC1=SRC1-Si,RC1$ 4) At step 308, the reason codes generation engine 106 is configured to identify the variable that produces the largest incremental drop Di,RC1 as the next reason code, RC2.

5) In the future rounds, steps 306 and 308 are repeated, wherein the reason codes variables that have already been identified are fixed at their trivial values. If k reason codes have been identified, the score to start with is $$SRC1,RC2,\ldots,RCk=M(X1,\ldots TRC1,\ldots,TRC2,\ldots,TRCk,\ldots,Xn).$$

To identify additional reason code, each of the remaining variables Xi is replaced with its corresponding trivial value Ti and the new score is $$Si,RC1,RC2,\ldots,RCk=M(X1,\ldots TRC1,\ldots,Ti\ldots,TRC2,\ldots,TRCk,\ldots,Xn), i=1-n \text{ except } RC1-RCk$$

The drop of score of the ith variable replacement is calculated as follows, $$Di,RC1,RC2,\ldots,RCk=SRC1,RC2,\ldots,RCk-Si, RC1,RC2,\ldots,RCk$$

Wherein the variable that produces the largest incremental Di,RC1,RC2, . . . , RCk is identified as the (k+1)th reason code, RC(k+1).

6) Once the desired number of reason codes have been identified through multiple round of iteration of steps 306 and 308, the reason codes generation engine 106 is configured to return the reason codes identified through the multiple rounds of iterations back to the computing device once a desired number of reason codes identified.

The advantage of the first variant of the trivial value replacement discussed above is its fast calculation speed, since the variables just need to be iterated once. The second variant is able to evaluate impact of both individual variables and two or more variables acting together. It is able to measure not just impact of one variable but also its incremental impact when other variable are present so that the impact of interactions among them can be evaluated. The second variant does come at the cost of additional computation time, since if N reason codes are required, each variable needs to be iterated N times.

Since ensemble models typically include hundreds or thousands of simple models, speed to generate the reason codes for the models does become a concern even with today's computers. In some embodiments, the module scoring engine 104 is configured to evaluate only a subset of important input variables for reason codes generation. In some embodiments, the reason codes generation engine 106 is configured to generate reason codes only for those with model scores larger than a certain threshold. These two approaches combined can reduce the reason codes generation time to a few percent or even lower, considering usually only the top few tens of variables are important and interesting cases are very sparse in the real applications.

The approaches discussed above can be applied to any ensemble models, including but not limited to bagging, boosting or other methods of ensembling simpler machine learning models, e.g. random forest, adaboost trees, gradient boosted trees etc. Bagging, also call bootstrap aggregating is a machine learning ensemble meta-algorithm to average outputs from models trained on bootstrap random samples of original data sets, designed to reduce model variance. Boosting is also a machine learning ensemble meta-algorithm for reducing bias primarily and also variance in supervised learning, and a family of machine learning algorithms which convert weak learners to strong ones. These approaches can also be applied to any black box machine learning models like neural network, or any white box methods like logistic regression or decision tree.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support reason codes generation, comprising:
    at least one computing unit comprising a module scoring engine running on the at least one computing unit, which in operation, is configured to:
    accept a plurality of input variables to an ensemble model from a computing device, wherein each input variable of the plurality of input variables identifies a value;
    identify a plurality of corresponding trivial values for the input variables to the ensemble model, wherein each corresponding trivial value is generated based on training data;
    determine a first score based on the values identified by the plurality of input variables for the ensemble model;
    replace at least one value identified by the plurality of input variables to the ensemble model with at least one corresponding trivial value of the plurality of corresponding trivial values;

determine a second score based on the first score and the values identified by the plurality of input variables for the ensemble model including the replaced at least one value;
replace a different at least one value identified by the plurality of input variables to the ensemble model with at least a different corresponding trivial value of the plurality of corresponding trivial values; and
determine a third score based on the first score and the values identified by the plurality of input variables for the ensemble model including the replaced different at least one value; and
a reason codes generation engine running on the at least one computing unit, which in operation, is configured to:
determine a change of a score of the ensemble model based on the second score and the third score;
generate a ranking based at least on the determined change;
generate at least one reason code for the ensemble model based on the generated ranking,
wherein the generated at least one reason code identifies at least one input variable of the plurality of input variables; and
provide the at least one generated reason code back to the computing device.

2. The system of claim 1, wherein:
the ensemble model is a collection of single models trained on historical data and used to calculate probabilities of future events happening given the input variables.

3. The system of claim 2, wherein:
the reason codes generation engine is configured to generate the reason codes only for the interesting class with model scores larger than a certain threshold to improve computing speed.

4. The system of claim 1, wherein:
prediction of an outcome of the ensemble model is labeled into two unbalanced classes with one interesting class takes minority of population of the ensemble model and the other uninteresting class takes majority of the population of the ensemble model.

5. The system of claim 4, wherein:
the plurality of corresponding trivial values are values of the majority of the population which predict high probability for the uninteresting, majority, class or low probability for the interesting, minority class given that the values of other variables remain unchanged.

6. The system of claim 4, wherein:
the plurality of corresponding trivial values include median, mean, most frequent value deduced from the population that predict low probability for the interesting, minority, class.

7. The system of claim 1, wherein:
the module scoring engine is configured to pre-calculate the plurality of corresponding trivial values of the input variables to the ensemble model based on the training data generated during previous evaluation.

8. The system of claim 7, wherein:
the module scoring engine, under a first variant, is configured to replace current value of only one of the input variables of the ensemble model at a time with its pre-calculated trivial value; and
calculate the changes of the scores produced by such trivial value replacement.

9. The system of claim 8, wherein:
the reason codes generation engine, under the first variant, is configured to rank the changes of the scores produced by the trivial value replacement;
return the variables that produce the top ranked changes as reason codes back to the computing device.

10. The system of claim 8, wherein:
the module scoring engine, under a second variant, is configured to perform a plurality of rounds of the first variant, and find the variables that make the biggest incremental changes on the scores to evaluate impact of interactions between two or more variables at the same time.

11. The system of claim 10, wherein:
the module scoring engine, under the second variant, is configured to replace unidentified variables with their corresponding trivial values while variables already identified as reason codes are fixed at their trivial values.

12. The system of claim 11, wherein:
the reason codes generation engine, under the second variant, is configured to return the reason codes identified through the plurality of rounds of iterations back to the computing device once a desired number of reason codes identified.

13. The system of claim 1, wherein:
the module scoring engine is configured to evaluate only a subset of the plurality of input variables for reason codes generation to improve computing speed.

14. A computer-implemented method to support reason codes generation, comprising:
accepting a plurality of input variables to an ensemble model from a computing device, wherein each input variable of the plurality of input variables identifies a value;
identifying a plurality of corresponding trivial values for the input variables to the ensemble model, wherein each corresponding trivial value is generated based on training data;
determining a first score based on the values identified by the plurality of input variables for the ensemble model;
replacing at least one value identified by the plurality of input variables to the ensemble model with at least one corresponding trivial value of the plurality of corresponding trivial values;
determining a second score based on the first score and the values identified by the plurality of input variables for the ensemble model including the replaced at least one value;
replacing a different at least one value identified by the plurality of input variables to the ensemble model with at least a different corresponding trivial value of the plurality of corresponding trivial values;
determining a third score based on the first score and the values identified by the plurality of input variables for the ensemble model including the replaced different at least one value;
determining a change of a score of the ensemble model based on the second score and the third score;
generating a ranking based at least on the determined change;
generating at least one reason code for the ensemble model based on the generated ranking, wherein the generated at least one reason code identifies at least one input variable of the plurality of input variables; and
providing the at least one generated reason code back to the computing device.

15. The computer-implemented method of claim 14, further comprising:
labeling prediction of an outcome of the ensemble model into two unbalanced classes with one interesting class takes minority of population of the ensemble model and the other uninteresting class takes majority of the population of the ensemble model.

16. The computer-implemented method of claim 14, further comprising:
pre-calculating the trivial values of the input variables to the ensemble model based on the training data generated during previous evaluation.

17. The computer-implemented method of claim 16, further comprising:
replacing current value of only one of the input variables of the ensemble model at a time with its pre-calculated trivial value; and
calculating the changes of the scores produced by such trivial value replacement under a first variant.

18. The computer-implemented method of claim 17, further comprising:
ranking the changes of the scores produced by the trivial value replacement;
returning the variables that produce the top ranked changes as reason codes back to the computing device under the first variant.

19. The computer-implemented method of claim 17, further comprising:
performing a plurality of rounds of the first variant, and find the variables that make the biggest incremental changes on the scores to evaluate impact of interactions between two or more variables at the same time under a second variant.

20. The computer-implemented method of claim 19, further comprising:
replacing unidentified variables with their corresponding trivial values while variables already identified as reason codes are fixed at their trivial values under the second variant.

21. The computer-implemented method of claim 20, further comprising:
returning the reason codes identified through the plurality of rounds of iterations back to the computing device once a desired number of reason codes identified under the second variant.

22. The computer-implemented method of claim 14, further comprising:
evaluating only a subset of the input variables for reason codes generation to improve computing speed.

23. The computer-implemented method of claim 14, further comprising:
generating the reason codes only for an interesting class with model scores larger than a certain threshold to improve computing speed.

24. A non-transitory computer readable storage medium having software instructions stored thereon that when executed cause a system to:
accept a plurality of input variables to an ensemble model from a computing device, wherein each input variable of the plurality of input variables identifies a value;
identify a plurality of corresponding trivial values for the input variables to the ensemble model, wherein each corresponding trivial value is generated based on training data;
determining a first score based on the values identified by the plurality of input variables for the ensemble model;
replace at least one value identified by the plurality of input variables to the ensemble model with at least one corresponding trivial value of the plurality of corresponding trivial values;
determine a second score based on the first score and the values identified by the plurality of input variables for the ensemble model including the replaced at least one value;
replace a different at least one value identified by the plurality of input variables to the ensemble model with at least a different corresponding trivial value of the plurality of corresponding trivial values;
determine a third score based on the first score and the values identified by the plurality of input variables for the ensemble model including the replaced different at least one value;
determine a change of a score of the ensemble model based on the second score and the third score;
generate a ranking based at least on the determined change;
generate at least one reason code for the ensemble model based on the generated ranking, wherein the generated at least one reason code identifies at least one input variable of the plurality of input variables;
provide the at least one generated reason code back to the computing device.

* * * * *